United States Patent [19]

Smith

[11] Patent Number: 5,793,553
[45] Date of Patent: Aug. 11, 1998

[54] METHOD AND ASSEMBLY FOR INCREASING STORAGE DEVICE RELIABILITY

[75] Inventor: Gordon J. Smith, Rochester, Minn.

[73] Assignee: International Business Machines Corporation, Armonk, N.Y.

[21] Appl. No.: 634,730

[22] Filed: Apr. 19, 1996

[51] Int. Cl.$^6$ ................................................. G11B 15/48
[52] U.S. Cl. .................... 360/74.1; 360/128; 360/137; 360/78.04
[58] Field of Search ............................ 360/74.1, 69, 71, 360/75, 77.02, 78.04, 128, 137

[56] References Cited

U.S. PATENT DOCUMENTS

| | | | |
|---|---|---|---|
| 3,609,721 | 9/1971 | Meneley | 360/78.04 |
| 4,384,311 | 5/1983 | McNeil | 360/128 |
| 4,754,397 | 6/1988 | Varaiya et al. | 364/200 |
| 4,817,035 | 3/1989 | Timsit | 364/900 |
| 5,351,156 | 9/1994 | Gregory et al. | 360/74.1 |
| 5,424,884 | 6/1995 | Nonaka | 360/74.1 |

FOREIGN PATENT DOCUMENTS

| | | |
|---|---|---|
| 61-160878 | 7/1986 | Japan . |
| 61-170958 | 8/1986 | Japan . |
| 1-119957 | 4/1989 | Japan . |
| 4-67351 | 3/1992 | Japan . |
| 4-125852 | 4/1992 | Japan . |
| 4-271062 | 9/1992 | Japan . |
| 4-337510 | 11/1992 | Japan . |

OTHER PUBLICATIONS

IBM Technical Disclosure Bulletin, vol. 26, No. 2, Jul. 1983, regarding: Magnetic Head On–Line Cleaning, authors: F. Ertingshausen, H. Hinkel and H.G. Nauth.

*Primary Examiner*—Andrew L. Sniezek
*Attorney, Agent, or Firm*—John J. Gresens; Matthew J. Bussan

[57] ABSTRACT

The invention increases the reliability of a data storage device. The data storage devices contain a memory element disk, containing data, the memory element disk being rotatably mounted about an axis, a transducer head, an actuator for moving the transducer head relative to the disk, and a counter for counting the number of seek operations performed by the transducer head. The invention may include setting a threshold seek value $T_{seek}$ and comparing this value to the actual seek performed by the head, $V_{seek}$, to determine the need for a stop/start operation. Alternatively, the invention includes defining threshold seek operation count $T_{seek}$, counting the number of seek operations to determine $M_{seek}$ since the last stop/start operation, recalling the total number of seek operations completed by the data storage device to define $N_{seek}$, defining $D_{seek}$ by determining the difference between $N_{seek}$ and $M_{seek}$, and determining whether $D_{seek}$ is equal to or greater than $T_{seek}$. When $D_{seek}$ is equal to or greater than $T_{seek}$, the transducer head undergoes a stop/start operation. $M_{seek}$ may then be reset to equal $N_{seek}$ before the stop/start operation is undertaken. When $D_{seek}$ is less than $T_{seek}$ the count is commenced. The invention may also be used with devices that additionally have auxiliary memory and with arrays of data storage devices.

17 Claims, 8 Drawing Sheets

METHOD AND ASSEMBLY FOR INCREASING STORAGE DEVICE RELIABILITY

FIELD OF THE INVENTION

This invention relates generally to direct access storage devices which may be used in applications, such as computers. More specifically, the invention relates to assemblies and methods for improving the reliability of direct access storage devices that are used in computers.

BACKGROUND OF THE INVENTION

Direct access storage devices or disk drives are an integral part of most computing devices. Disk drives, whether based on magnetic or optical storage technologies, are frequently used in computing systems to provide rapid, random access to stored data. Over the years disk drive technology has progressed to a point where a massive amount of data may now be stored in a disk drive device using small diameter, non-removable disks.

The disk drive units typically include a rigid disk on which a magnetic medium is provided. A protective overcoat is applied to the magnetic medium which is typically carbon or zirconia with a thin coating of liquid or solid lubricant such as polyperfluoroether.

Data is written to and read from the medium by a transducer which flies over the disk on a cushion of air referred to as an "air bearing". A slider supports one or more transducer heads and is mounted to an arm suspended from a pivot point over the disk. The air bearing is created by the aerodynamic properties of the slider as it encounters air pressure resulting from by the high speed rotation of the disk (3600–7200 rpm). Thus, notwithstanding the lubricant applied to the disk, air is the primary lubricant while the transducer is flying. At the high rotation rates of conventional drives, failure of the slider to maintain head-disk separation can result in excessive contact between the head and disk or a head crash.

A head crash, may result from any series of events. Sliders may use a negative pressure airbearing. In this case the slider often acts as a vacuum cleaner. Materials on the disks can be picked up and retained in the negative pressure cavity of these sliders. For more traditional positive pressure sliders, debris often accumulates on the leading-edge tapers and airbearing rails. These collection points are also seen for negative pressure sliders. Thus as disks collect materials, the sliders sweeping over them collect this material.

For example, the system may start off with the slider flying or in limited contact with the disk. If the slider then picks up some debris, the debris will either drag over the disk or alter the air bearing such that the slider flies lower. Debris may continue to collect on the head and slider as it flies at lower and lower spacings. Eventually, the slider begins to contact the disk continuously using up the liquid or solid lubricant, wearing through the carbon overcoat, and damaging the magnetic medium. This will roughen the disk surface making even partial flying over the affected tracks difficult, resulting in an inability to read and write data.

Examples of assemblies which have attempted to ease environmental stresses of the hard disk environment are known. Masuyama, JP Appl. No. 02-246288, teaches removal of minute dust particles accumulated on magnetic heads to promote the head reliability by stopping the rotation of the head disk assembly whenever a fixed time is passed. Kawakubo, JP61-170958(A), teaches clearing the attachment on a magnetic head, which is caused by the entry of dust during the continuous rotation, by means of the automatic stoppage and rerotation based on time.

Gregory, U.S. Pat. No. 5,351,156, teaches using the back edge of a disk drive slider to remove debris from disk media by slowly sweeping it from the inner diameter of the disk to the outer diameter of the disk while the disk is rotating. The sweeping operation is completed while the disks are still gaining rotational speed so that liftoff velocity is not achieved. Material accumulated on the back edge of the slider is either dumped at the outer diameter of the disk, or remains on the back edge of the slider as normal operation is commenced.

McNeil, U.S. Pat. No. 4,384,311, teaches a method for cleaning the magnetic disk surfaces and the heads. The heads are loaded and caused to fly on the disc surfaces. The spindle motor speed is reduced to a speed where the heads fly at approximately 50% of the normal flying height and the head support structure drive motor is commanded to sweep the heads across the disc surfaces, forward and reverse. This is intended to remove any particles down to an elevation that is 50% of the normal flying height. The same operation is completed with a spindle speed creating 25% of normal flying height.

Meneley, U.S. Pat. No. 3,609,721, teaches a method for dislodging and clearing away dust particles from the surface of a magnetic, data-storage disc. The disc is run at operating speed and a flying head is swept across it slowly, for example, at the rate of one-fourth to less than one-twentieth the width of the slider during each revolution of the storage disc.

Komiyama, JP Appl. No. 03-110045, teaches a method for cleaning an unstoppable system by stopping and restarting the rotation of the disk after shifting the magnetic head to a cleaning area on a disk. Asada, JP Appl. No. 3-31260, teaches a method to prevent dust from sticking to a magnetic head in a magnetic disk device. A spindle motor control circuit repeats a motor start/stop operation during operation of the drive. Ishihara, JP Appl. No. 4-67351, teaches a method for removing fine dust and improving reliability by which a stop operation and a start operation are continuously executed in a disk drive.

Nakazawa, JP Appl. No. 62-278545, teaches preventing a head crash by measuring the operating time of the device and instructing the device to undertake contact-start-stop operation when a predetermined value is reached. Konno, JP Appl. No. 61-160878, teaches prevention of fusion (or stiction) of a magnetic head to a magnetic disk by revolving a magnetic disk intermittently while no reading or writing actions are being undertaken. Other references which also teach disk drive assemblies include U.S. Pat. No. 4,817,035 to Timsit and U.S. Pat. No. 4,754,397 to Varaiya et al.

However, these publications do not provide a process for cleaning the head and the disk which is based upon use of the head in seeking operations. Execution of stop/start operations based on operational time often does not solve the problem of debris accumulation. Further, it can often exacerbate the problem by generating added head sweeps when no read/write operations have been undertaken. In this instance, the head assembly becomes a further accumulator of debris. As a result, there is a need for an apparatus and method which will increase disk drive reliability by reducing the amount of contaminant debris which contacts the head and disk.

SUMMARY OF THE INVENTION

In accordance with a first aspect of the invention there is provided a data storage device. The data storage device includes a disk rotatably mounted about an axis. An actuator for moving the transducer head relative to the disk is also present. The data storage device also contains a counter for counting the number of seek operations performed by the actuator since a stop/start operation has occurred. There is also present means for initiating another stop/start operation when the counter reaches a predetermined number. The data storage device may also have a non-volatile random access memory for temporarily storing write data received by the data storage device while the stop/start operation is being performed.

In accordance with an additional aspect of the invention there is provided an array controller for controlling a plurality of data storage devices. Each of the data storage devices may contain a memory element disk rotated about an axis, and an actuator for moving the transducer head relative to the disk. The array controller also comprises the counter for counting the number of seek operations performed by the actuator of each respective one of the data storage devices since a stop/start operation has occurred in the respective data storage device. Also, present in the array controller are means for initiating another stop/start operation in the respective data storage devices based on the count of the counter. Here again, the array controller may also contain a non-volatile random access memory for temporarily storing write data for said respective data storage device while another stop/start operation is performed in the data storage device.

In accordance with a second aspect of the invention there is provided a method of increasing the reliability of a data storage device. The method comprises defining a threshold seek operation count, $T_{seek}$, counting the number of seek operations since the last stop/start operation to determine $V_{seek}$ and comparing $T_{seek}$ to $V_{seek}$. Once $V_{seek}$ is equal to or exceeds $T_{seek}$ a stop/start operation is undertaken and the counter is reset.

In accordance with a further aspect of the invention, there is provided a method of increasing the reliability of an array of data storage devices. The method comprises defining a threshold seek operation count, $T_{seek}$, counting the number of seek operations since the last stop/start operation to determine $V_{seek}$ and comparing $T_{seek}$ and $V_{seek}$. Once $V_{seek}$ is equal to or exceeds $T_{seek}$, a stop/start operation is undertaken and the counter is reset.

In accordance with an alternative aspect of the invention, there is provided a method of increasing the reliability of a data storage device. The method comprises the steps of defining a threshold seek operation count $T_{seek}$, counting the number of seek operations since the last stop/start operation to determine $M_{seek}$, recalling the total number of seek operations completed by the data storage device to define $N_{seek}$, defining $D_{seek}$ by determining the difference between $N_{seek}$ and $M_{seek}$, and determining whether $D_{seek}$ is greater than $T_{seek}$.

In accordance with a further alternative aspect of the invention, there is provided a method of increasing the reliability of an array of data storage devices. The method of the invention includes defining threshold seek operation count $T_{seek}$ for each drive of the array, counting the number of seek operations since the last/stop start operation to determine $M_{seek}$, recalling the total number of seek operations completed by the data storage device to define $N_{seek}$, defining $D_{seek}$ by determining the difference between $N_{seek}$ and $M_{seek}$, and determining whether $D_{seek}$ is greater than $T_{seek}$.

The invention may be executed in a data storage device having a disk rotatably mounted about an axis, and an actuator for moving a transducer head relative to the disk. The device generally also has a counter for counting the number of seek operations performed by the actuator since a stop/start operation has occurred, and means for initiating another stop/start operation when the count of the counter reaches a predetermined number. The data storage device also may have a non-volatile random access memory for temporarily storing read/write data. The read/write data is sent to the auxiliary memory by the data storage device while the stop/start operation is performed. The invention may also be executed with an array controller which controls a plurality of data storage devices.

In an alternative embodiment, the invention bases the stop and restart operations on the number of seeks operations that have occurred and the power-on-hours since the last stop/start operation. If a critical number of seeks has occurred over a certain length of time, then a drive is stopped and then immediately restarted. The purpose of the start/stop operation is to remove excessive materials from the sliders and transfer these to the landing zone.

The invention is also applicable to disk drive arrays. Although disk drive arrays often can tolerate a drive failure, system performance suffers while a drive is being replaced and while the data on the new drive is reconstructed. In file server applications, for instance, rapid data availability is of paramount importance. These servers provide storage for multiple users where the data demand is synchronous. Multiple disk drives are connected to a controller which emulates a single virtual drive. To the file server, the independent disk drives are not seen as an individual disk drives. In a redundant disk array, one or more simultaneous drive failures can occur without losing any data.

This invention is suitable for arrays that may sustain one or more drive failures. When a drive becomes inoperable, all user data continues to be available because of the redundancy found in the array. If the array uses distributed parity, for example, data on the failing drive can be reconstructed by combining the parity and data on one or more of the other drives. In larger array systems, a non-volatile memory is often included to assist in the transfer of data to and from the individual drives. If the non-volatile memory is used as a write cache, then data to be written is temporarily stored to increase efficiency. In this context "non-volatile" means that the memory does not fail for lack of power; either by catastrophic unintended loss of power or an intended power down by stop/start operation. If the array suddenly loses power, the non-volatile nature of this memory ensures that data that was being written at the start of the power failure is not lost.

DETAILED DESCRIPTION OF THE PREFERRED EMBODIMENT

The invention comprises methods and assemblies for increasing the reliability of a data storage device. Storage devices in which the method of the invention may be used generally comprise a memory element disk, containing data, the disk being rotatably mounted about an axis, and a transducer positioned to read and/or write data from/to the disk. The device also contains an actuator for moving the transducer head relative to the disk, and a counter for counting the number of seek operations performed by the transducer head.

Figure 1:
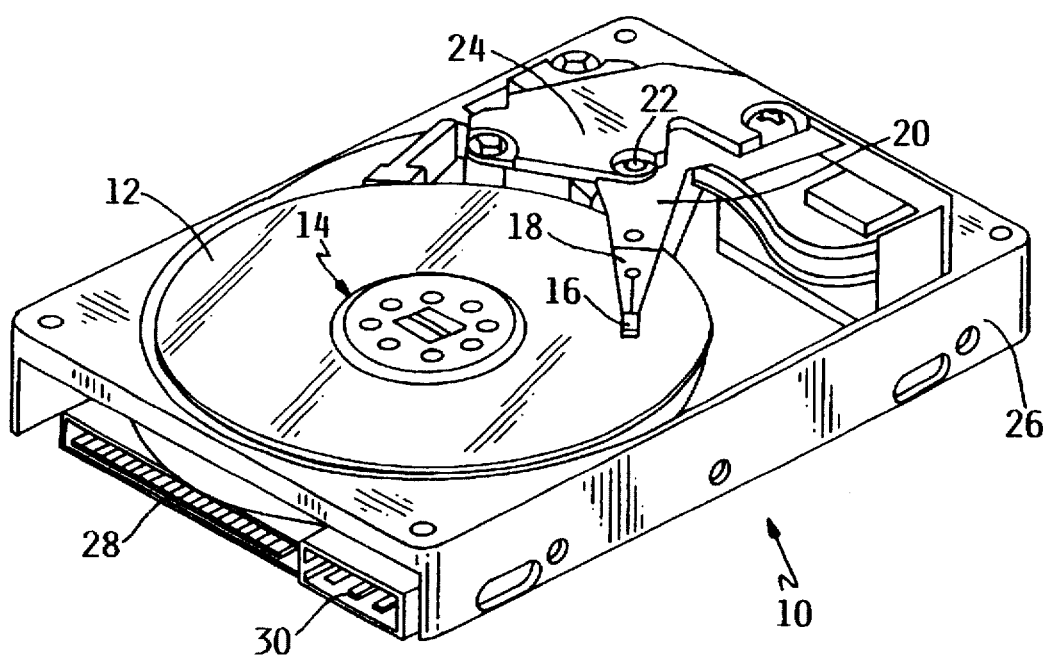
FIG. 1 is a perspective illustration of an exemplary data storage device which may be used with the invention.

In greater detail, FIG. 1 provides a perspective view of an illustrative data storage device or head disk assembly incorporating the teachings of the invention. The assembly 10 includes a disk 12 on which a magnetic medium is disposed. The disk 12 is rotated at high speeds about a spindle motor assembly 14. A magnetic transducer or head 16 is suspended over the disk at the end of a load beam 18. The head 16 and load beam 18 are suspended at the proximal end of an arm 20. The distal end of the arm 20 provides an armature within a voice coil actuator motor 24. The actuator motor 24 induces moments in the arm 20 about a pivot point 22 and thereby moves the head 16 in a general radial direction over the disk 12. The assembly is mounted within a frame 26 or disk drive enclosure. Spindle motor assembly 14, motor 24, as well as the head 16 are activated by a host system through an electronic circuit disposed on a circuit board. Electrical interconnect between the board and the host system is effected via a receptacles 28 and 30.

In a "stack", multiple head disk assemblies are stacked within a single unit. As is common in the art, the magnetic medium on the disk 12 is organized into cylinders, data tracks within the cylinders and sectors within the data tracks. An individual cylinder may be thought of as the same head location on more than one disk for a given movement of the load beam actuator. Data is written to and read from the radially spaced tracks by the transducer head 16. The position of the head relative to a particular track on the disk is maintained by a servo-control unit in a conventional manner. The load beam 18 is lightly biased against the aerodynamic lift of the slider so that the head 16 flies on an air bearing over the disk 12 when the disk 12 is rotated at a high speed by the spindle motor assembly 14.

In a typical data storage system, digital data is stored in the form of magnetic transitions on a series of spiral tracks or concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers being shifted from track to track, typically under the control of a controller. The transducer assembly typically includes a read element and a write element. Other transducer assembly configurations incorporate a single transducer element used to both write data to the disks and read data from the disks.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field.

With most drives, seek operations occur from the initiation of operations. Generally, a drive is started by turning the computer on. At that point, the drive comes ready, completing start up operations. The drive may then be accessed for read/write operations by the computer system with which the drive interfaces.

With each of these operations there are a number of "seek" operations which are undertaken by the head. A seek is the movement of the head radially across the disk. Generally, the head moves radially on a periodic basis either in routine idle, to avoid depletion of lubricant, or in reading and writing applications.

Figure 2:
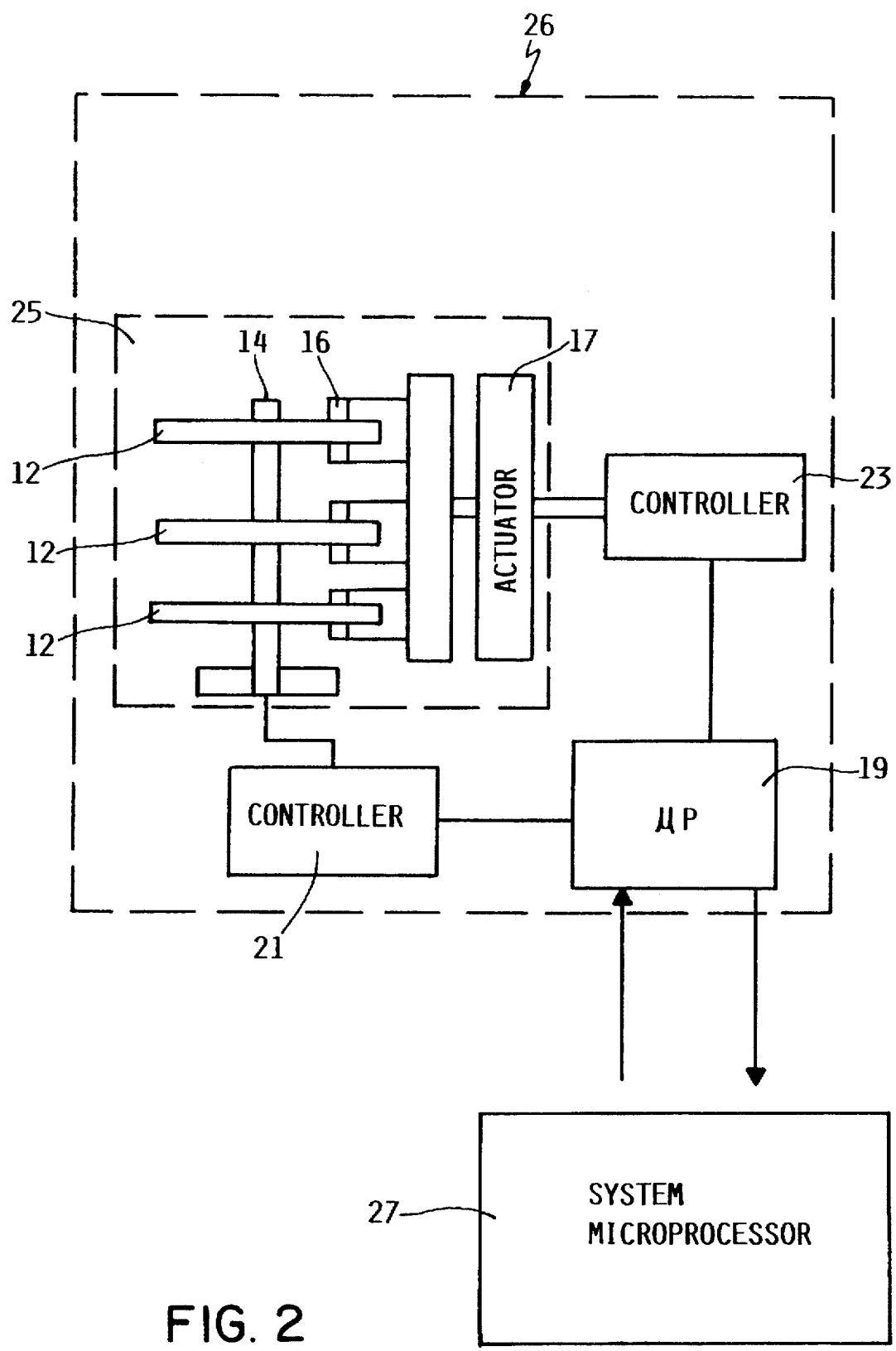
FIG. 2 is a schematic illustration of a disk drive enclosure which may be used with the invention.

As can be seen in FIG. 2, the hard drive is composed of a number of different constituent parts. There is a disk enclosure 25 within which are the hard drive memory elements 12. The memory elements 12 generally rotate above a spindle motor assembly 14. In turn, the heads 16 are controlled by an actuator 17. A microprocessor 19 controls the disk enclosure environment signalling a first controller 21 which controls the spindle motor assembly 14 as well as a second controller 23 which directs the actuator 17 rotating the disk drive heads 16. Generally, the method of the invention may be configured in any number of different environments consistent with the invention.

A counting program may generally be found in the microprocessor 19 for counting the number of seek operations undertaken by the head over any given period of time. The microprocessor 19 controls movement of the head and, in turn, is controlled by the computer system microprocessor 27, for example, on the computer system mother board.

Turning to FIG. 2, a schematic diagram of the method of the invention may generally be seen. Generally, any drive assembly, stack of assemblies, or array of drive assemblies is supported by various control procedures found on the operational memory in one or more of the computer system microprocessor 27, disk drive microprocessor 19, disk 12 or other memory elements of the disk drive 10. The operational memory including the counting program may be programmed into any of these elements within the system. These control procedures are used to assist the drive in coming ready to operate and initiating the use of variety of applications. The computer system, which includes the direct access storage device, generally comprises programming which counts individual seek operations as part of this operational memory.

Figure 3:
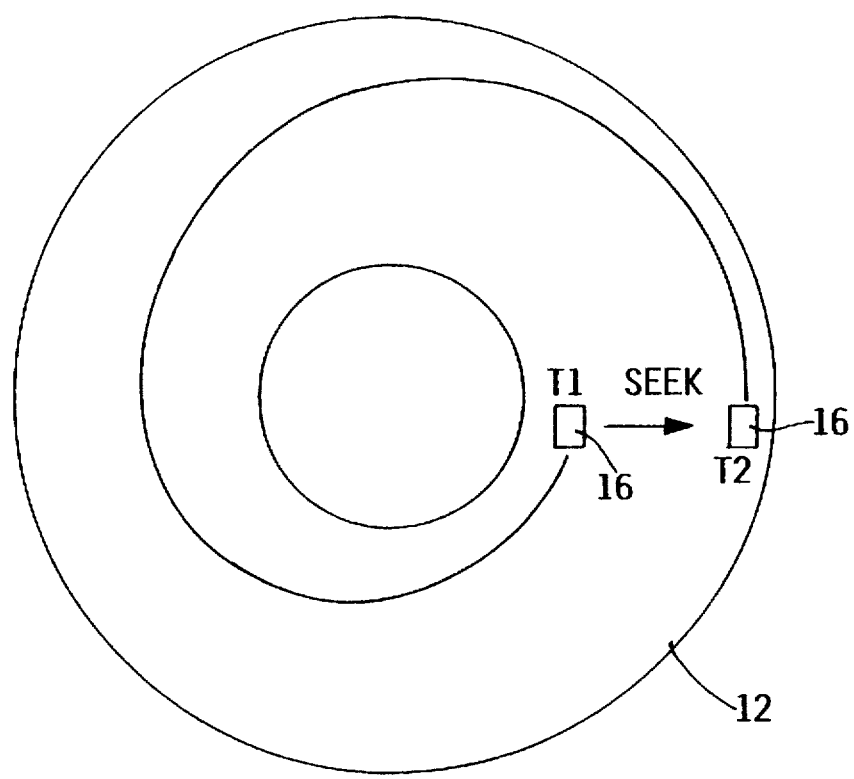
FIG. 3 is a schematic illustration of an exemplary seek operation undertaken by a disk drive assembly such as that depicted in FIG. 1.

The typical seek operation is shown in FIG. 3. Each seek operation moves the head 16 over a new disk area. At T1, the head starts movement in a relationship to the disk 12. Since the disk 12 is constantly rotating, the movement of the head 16, while essentially radial is in a spiral pattern in relationship to the disk 12. As the seek operation progresses, the head 16 moves outward, radially, to point T2. Thus with each seek, more material accumulates on the head 16. If this accumulation continues over several weeks, and the drive is stopped and not started for several minutes, the drive may not start. The conditions may worsen at elevated temperatures. The accumulated material on the slider forms a bond with the disks and this creates a force which is many times what a drive motor can provide.

In FIG. 2 there is generally an exponential relationship between the signal strength and the distance between the recording head 16 and disk 12. Increasing the distance between the head 16 and the disk 12 may decrease signal strength to a point at which the data previously recorded on the disk is unreadable. As a result, the unnecessary vertical motion of a head with respect to a disk may also contribute to system failure.

Figure 4:
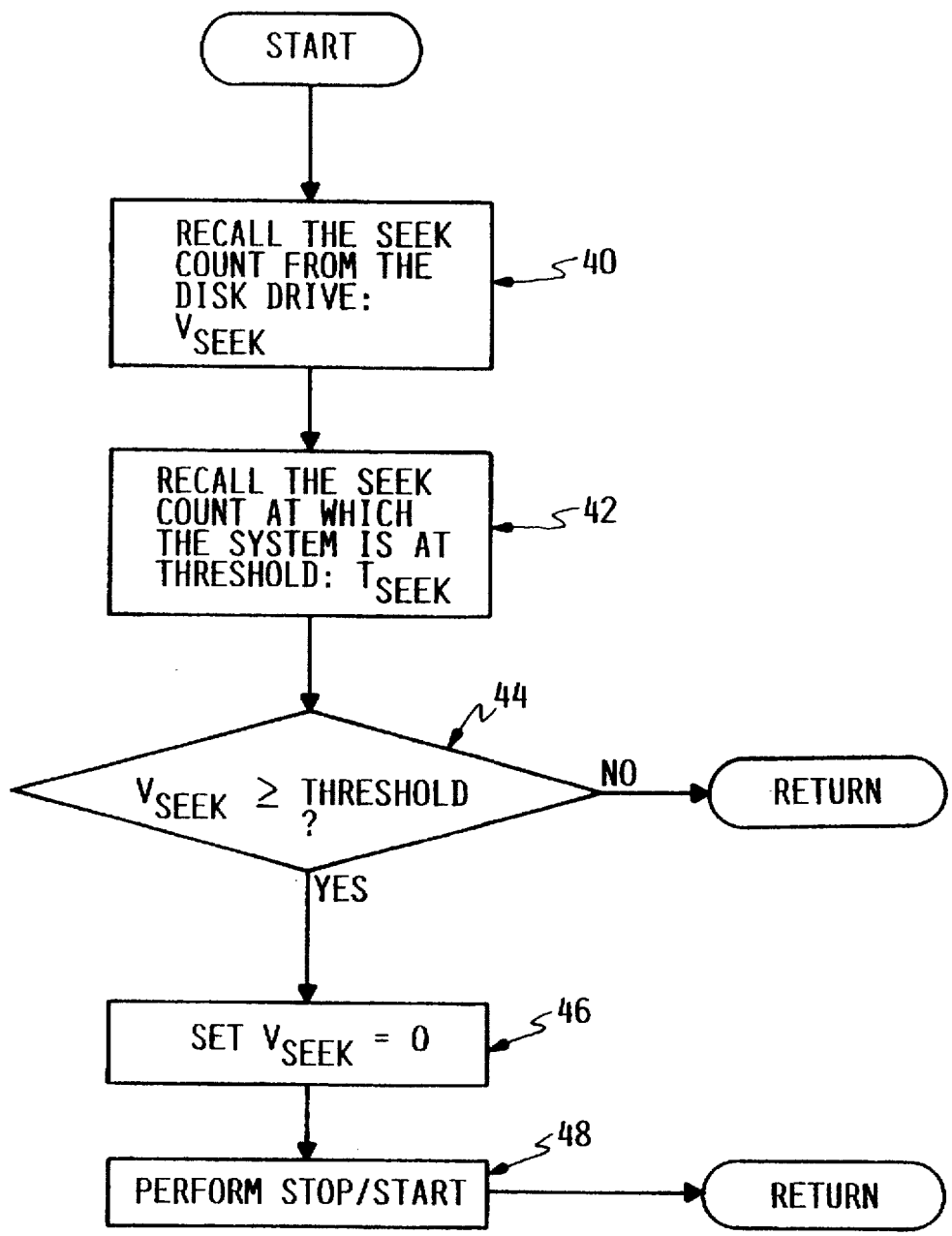
FIG. 4 is a schematic illustration of one embodiment of the invention.

The method of the invention is initiated by programming the computer system to count the number of seek operations and recall the seek operations undertaken to compare these against a threshold count. Again, programming may be completed in any of the system elements which contain the system's operational memory. Specifically, turning to FIG. 4, the operational memory is programmed to count and recall the seeks completed by the drive head across the surface of the disk STEP 40. The varying seek count, $V_{seek}$, is initially set at zero and seeks are counted from activation of the system, but once a stop/start operation is performed, the varying seek count, $V_{seek}$, is reset to zero and seeks are counted from the last stop/start operation. The operational memory also recalls the seek count at which the drive is at threshold, $T_{seek}$, STEP 42. This parameter, $T_{seek}$, is used to evaluate the need for stop/start operations as it provides a true indication of actual hard drive use; the movement of the head 16 across the hard disk element 12. $T_{seek}$ may be set at any value which reflects the size and usage level of the computer system. For example, a single drive computer system may have usage at a different level than computer system having an array of more than one drive. Further, personal computer systems may receive different levels of usage when compared to computer systems used by institutions. This varying seek count, $V_{seek}$, is compared to the threshold seek count $T_{seek}$, STEP 44, and when:

$$V_{seek} \geq T_{seek} \tag{1}$$

a stop/start operation is initiated, STEP 48. $V_{seek}$ may then be reset to zero so that once the stop/start operation is completed, the seek count may resume, STEP 46.

An alternative means of executing the invention is to use a counter which counts the number of seeks undertaken by the system from the initial activation of the system. Once reviewed, if the number of seek operations completed meets or exceeds a threshold level, $T_{seek}$, a stop/start operation is undertaken, and the counting operation is reset.

Figure 5:
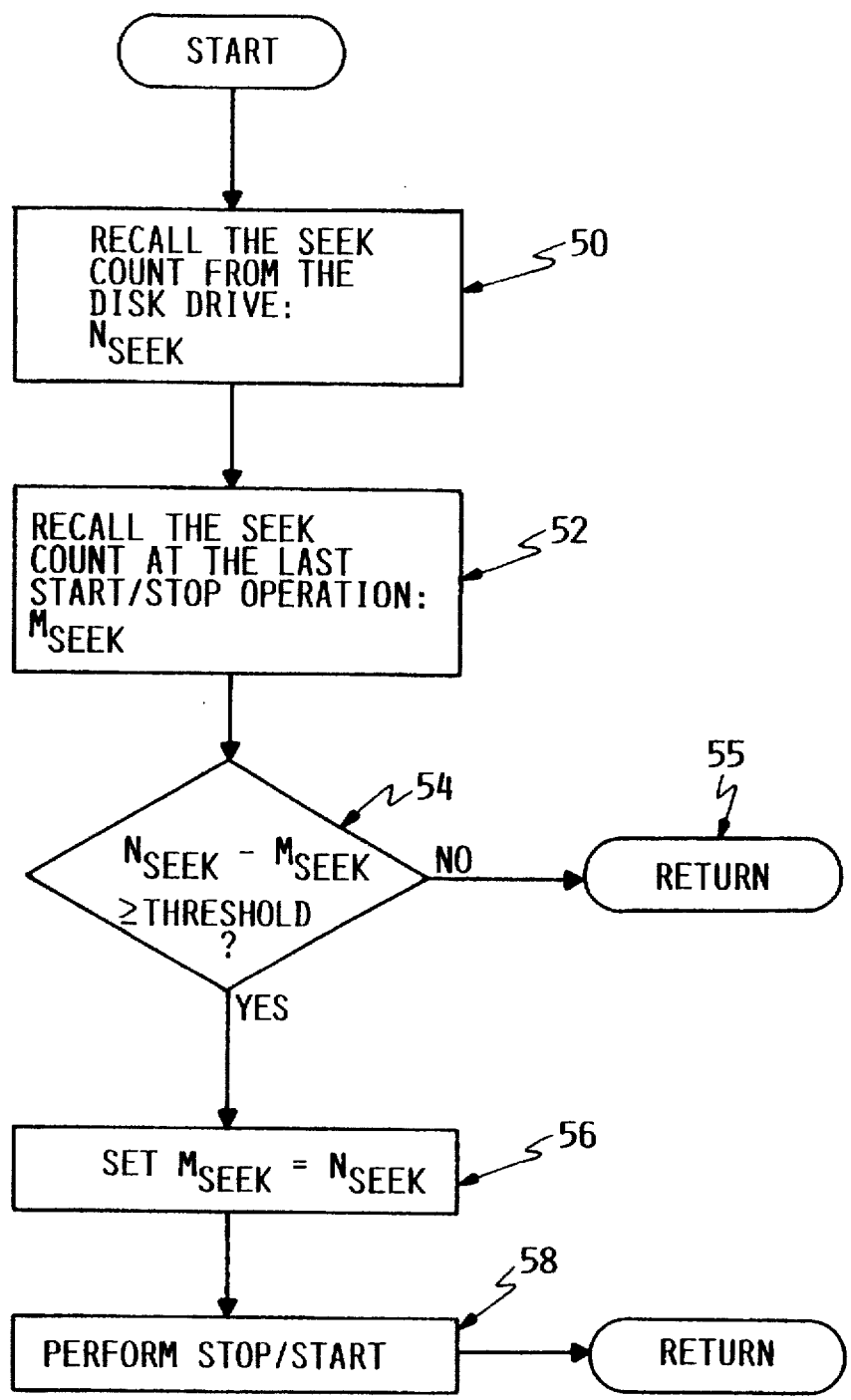
FIG. 5 is a schematic illustration of an alternative embodiment of the invention.

In greater detail, as can be seen in the flow chart shown in FIG. 5, the operational memory may be programmed to recall the threshold number of seeks, $T_{seek}$, which must be undertaken before a stop/start operation is undertaken. The operational memory of the computer system may then be programmed to count and recall $N_{seek}$, STEP 50, to determine whether the seek operation parameter identified as $T_{seek}$ has been met. This operation is initiated by determining the total number of seeks which the computer system has completed since beginning operation, $N_{seek}$.

The next parameter defined by the operational memory of the computer system is the number of seeks undertaken since completion of the last stop/start operation, $M_{seek}$ STEP 52. Stop/start operations may occur, for example, with the first use of the computer system, routine trouble shooting operations which occur as the computer system is brought into full operational capability, or with the powering down of the computer system at the termination of routine use.

Once $N_{seek}$ and $M_{seek}$ are defined, the operational memory compares these two parameters to determine whether a stop/start operation should be undertaken, STEP 54.

Once compared, if:

$$N_{seek} - M_{seek} < T_{seek} \tag{2}$$

then the program continues to count and recall seeks, STEP 55.

However, once compared, if:

$$N_{seek} - M_{seek} \geq T_{seek} \tag{3}$$

the operational memory resets the parameter $M_{seek}$, STEP 56, so that:

$$M_{seek} = N_{seek} \tag{4}$$

and initiates a stop/start operation, STEP 58.

Figure 6:
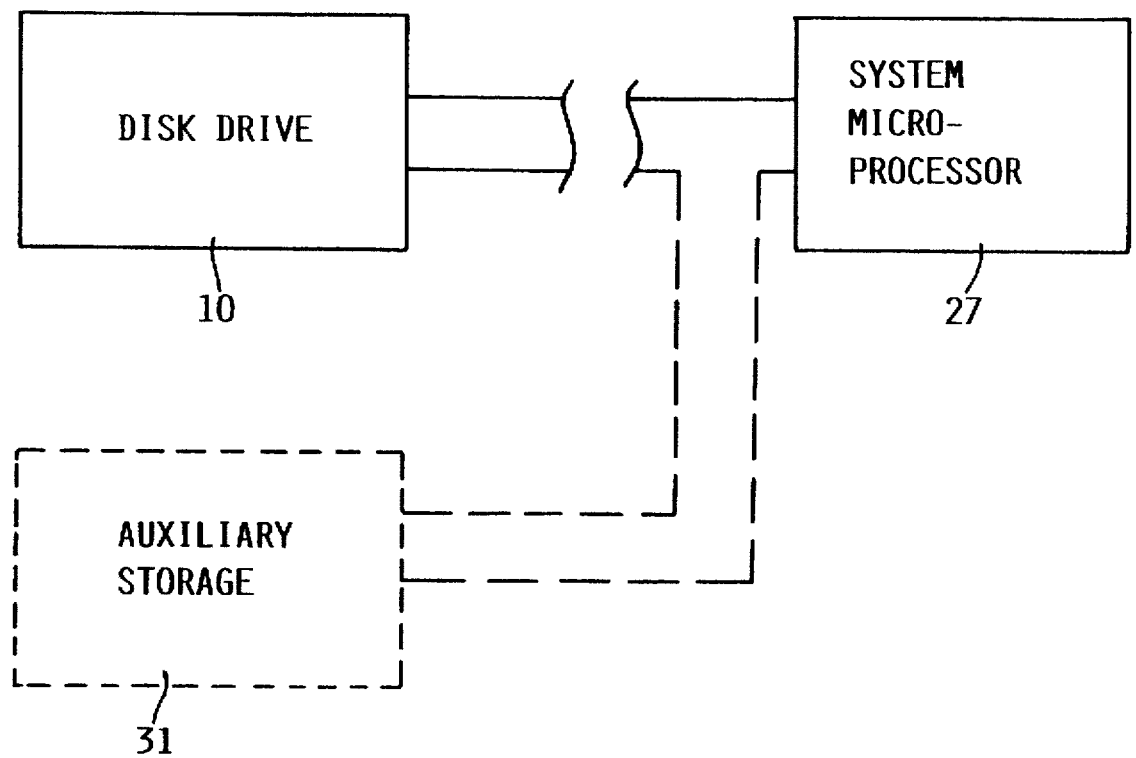
FIG. 6 is a schematic illustration of a computer system which is supported by auxiliary memory.

Turning to FIG. 6, in certain applications, auxiliary memory (or storage) 31 may be available within the computer system. Auxiliary memory 31 is often used to maintain the computer system microprocessor 27 operation in environments with high user volume such as administrative or service operations in financial, communications, or governmental institutions.

Auxiliary storage or memory may be an element separate from the computer system or encompassed within the computer system itself. Auxiliary storage may comprise a nonvolatile or fault tolerant storage, such as an added disk drive, additional random access memory, or flash memory, i.e. electronically erasable programmable read only memory.

Figure 7:
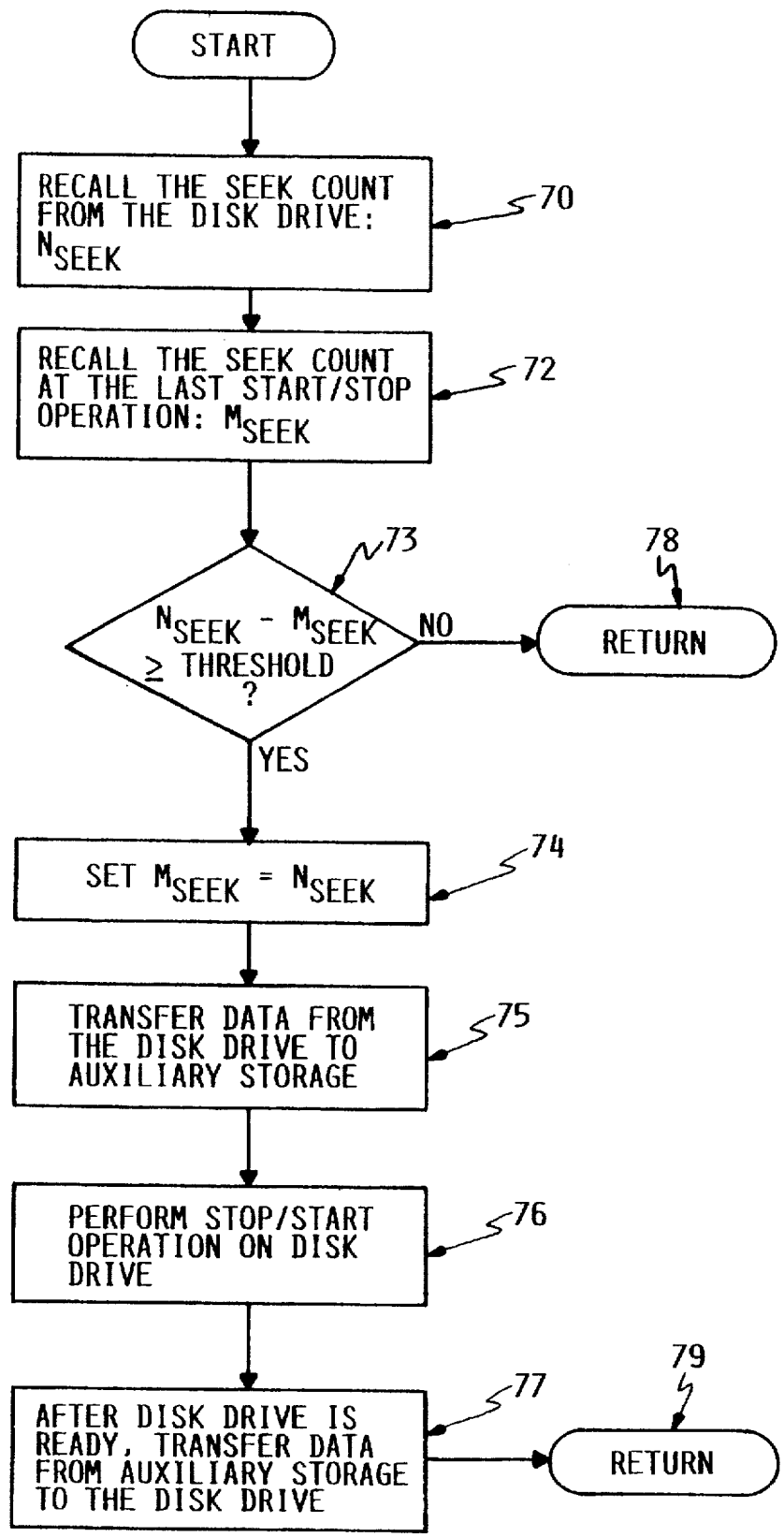
FIG. 7 is a schematic illustration of an alternative embodiment of the invention.

Turning to FIG. 7, the system of the invention for use with a computer comprising auxiliary memory storage may be seen. When auxiliary storage is present, the system proceeds through the same steps depicted in FIG. 5. However, the operational memory of the computer system, transfers the data of interest to the auxiliary storage when the condition set by equation 3 above is met. The stop/start operation is then completed. After the hard drive element is powered back up the data is transferred back onto the hard disk element.

Specifically, the operational memory of the computer system is programmed to count and recall the number of seek operations undertaken since initiation of system operation $N_{seek}$, STEP 70 (see FIG. 7). The system is also programmed to count and recall $M_{seek}$, that is the number of seek operations undertaken since the last stop/start operation, STEP 72. As with the operation depicted in FIG. 5, $N_{seek}$ and $M_{seek}$ are compared, STEP 73, and when the condition of equation 2 is met, seek counting continues, STEP 78. When the condition of equation 3 is met, $M_{seek}$ is reset to equal $N_{seek}$, STEP 74. Data is then transferred from the virtual drive to the auxiliary storage by the array controller, STEP 75. A stop/start operation is then initiated in the disk drive STEP 76. After the stop/start operation has been completed, the data may then be transferred back to the disk drive from the auxiliary storage, STEP 77. The seek operational count may then be resumed, STEP 79.

Figure 8:
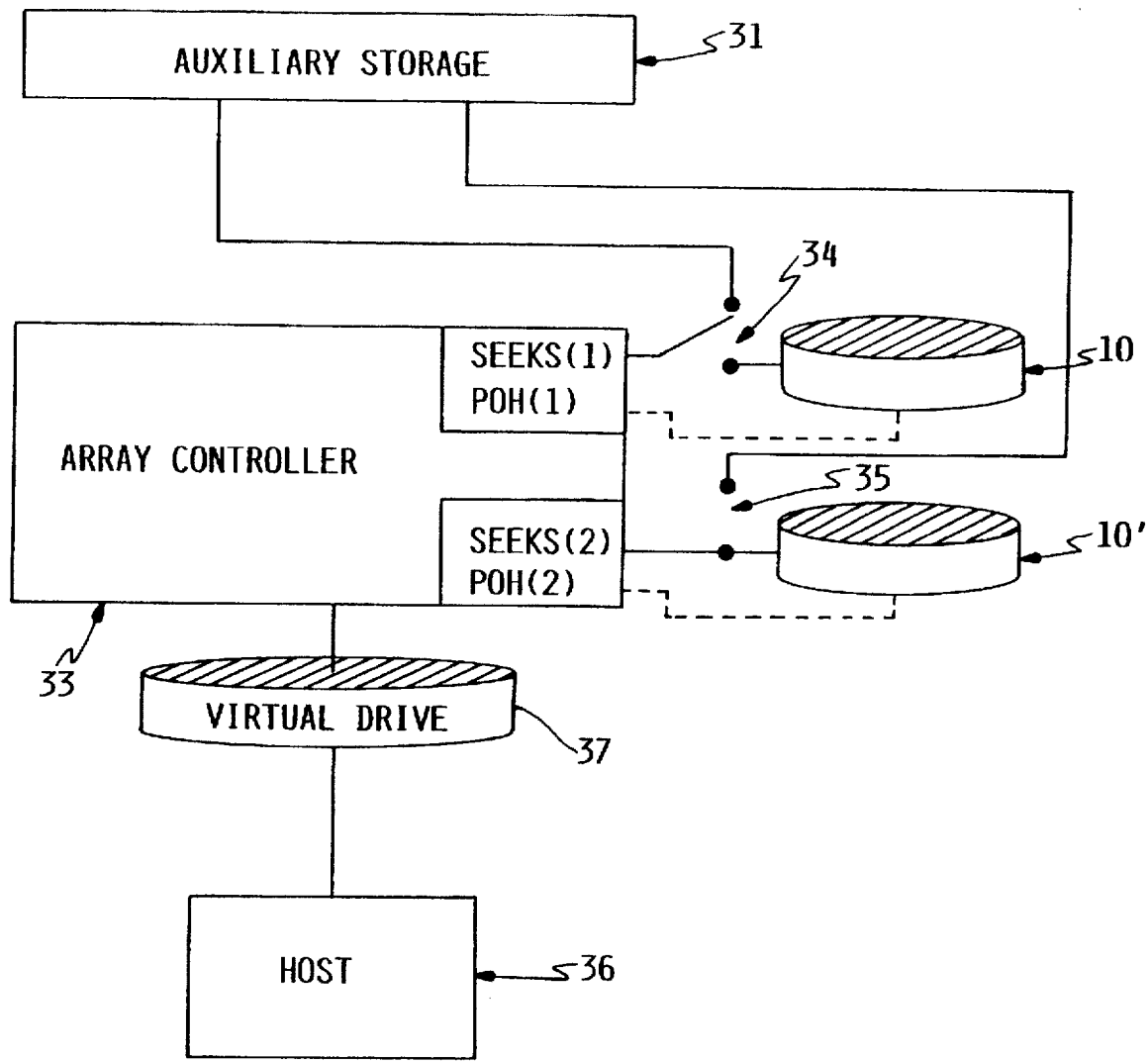
FIG. 8 is a schematic illustration depicting application of the invention to an exemplary array system.

The invention is also useful in the operation of arrays of multiple disk drives used in parallel, see FIG. 8. Array systems provide the operator with a fast response, more data storage space, and a greater tolerance to disk drive failure. Array configurations such as redundant arrays of disk drives are also systems which are useful with the invention. Disk drive arrays are more fault tolerant than single drive assemblies. However, performance can suffer in an array system while a drive is being replaced. The method of the invention may be used to increase reliability within disk drive arrays.

An exemplary array system may be seen in FIG. 8. Two disk drives 10 and 10' are connected, through an array controller 33 to a host. The host 36 does not see the action of the individual drives 10 and 10', but rather sees a virtual drive 37 as controlling the ongoing read/write operations.

In operation each new seek operation moves the slider(s) for 10 and 10' over a new disk area. Thus with each new seek operation, more material may accumulate on the respective sliders. Accumulation over an extended period of time may result in a head crash on one or more of the drives.

In accordance with an alternative aspect of the invention, each stop/start operation may be undertaken by monitoring the earlier of threshold limits for power-on-hours or seeks. As can be seen in FIG. 8, the array controller can be configured to recall both seeks and power-on-hours to initiate stop/start operations.

Normally, data transfer proceeds from the host, through the array controller 33 to the drives 10 and 10'. The switches 34 and 35 connect the array controller 33 to each of drives 10 and 10'. Generally, the data on drives 10 and 10' is redundant and failure of either drive can be tolerated.

As shown in FIG. 8, the array controller 33 comprises the operational memory for determining whether the accumulated number of seek operations for either drive 10 or 10' dictates a stop/start operation is dictated. As shown in FIG. 8, virtual drive 37 is transferring data to the auxiliary storage 31 through the array controller 33.

The auxiliary storage 31 replaces drive 10 while this drive is stopped and immediately restarted. Once drive 10 is restarted, the data that was to be written to drive 10 can now be transferred from the auxiliary storage 31 to the drive 10.

The auxiliary storage speeds the recovery of the array system after the stop/start operation is completed. Alternative embodiments of this array system also support use of the method of the invention. For example, the auxiliary storage may also be an additional redundant hard drive, any number of hard drives or memory elements for use with the method of the invention.

The above specification, examples and data provide the complete description of the manufacture and use of invention. Since many embodiments of the invention can be made without departing from the spirit and scope of the invention, the invention resides in the claims hereinafter appended.

I claim:

1. A data storage device comprising:
    a memory element disk rotatably mounted about an axis;
    an actuator for moving a transducer head relative to said disk;
    a counter for counting the number of seek operations performed by said actuator since a stop/start operation has occurred; and
    means for initiating another said stop/start operation when the count of said counter reaches a predetermined number.

2. A data storage device comprising:
    a memory element disk rotatably mounted about an axis;
    an actuator for moving a transducer head relative to said disk;
    a counter for counting the number of seek operations performed by said actuator since a stop/start operation has occurred;
    means for initiating another said stop/start operation based on the count of said counter; and
    a non-volatile random access memory for temporarily storing write data for said data storage device while said another stop/start operation is performed.

3. An array controller for controlling a plurality of data storage devices, each of the data storage devices including a memory element disk rotatably mounted about an axis and an actuator for moving a transducer head relative to the disk, said array controller comprising:
    a counter for counting the number of seek operations performed by the actuator of each respective one of the data storage devices since a stop/start operation has occurred in said respective one of the data storage devices; and
    means for initiating another said stop/start operation in said respective one of the data storage devices based on the count of said counter.

4. An array controller for controlling a plurality of data storage devices, each of the data storage devices including a memory element disk rotatably mounted about an axis and an actuator for moving a transducer head relative to the disk, said array controller comprising:
    a counter for counting the number of seek operations performed by the actuator of each respective one of the data storage devices since a stop/start operation has occurred in said respective one of the data storage devices;
    means for initiating another said stop/start operation in said respective one of said data storage devices based on the count of said counter; and
    a non-volatile random access memory for temporarily storing write data for said respective one of said data storage devices while said another stop/start operation is performed in said respective one of the data storage devices.

5. A method of increasing the reliability of a data storage device, said data storage device comprising a memory element disk containing data rotatably mounted about an axis, a transducer head, and actuator for moving said transducer head relative to said disk, and a counter for counting the number of seek operations performed by said transducer head, said method comprising the steps of:
    (a) defining a threshold seek operation count $T_{seek}$;
    (b) counting the number of seek operations since the last stop/start operation to determine $V_{seek}$;
    (c) determining whether $V_{seek}$ is equal to or greater than $T_{seek}$; and
    (d) performing another stop/stop operation when $V_{seek}$ is greater than or equal to $T_{seek}$.

6. The method of claim 5, wherein when $V_{seek}$ is equal to or greater than $T_{seek}$, said transducer head undergoes another stop/start operation.

7. The method of claim 6, wherein $V_{seek}$ is reset to equal zero before said another stop/start operation is completed.

8. The method of claim 5, wherein the said device additionally comprises auxiliary memory.

9. The method of claim 8, wherein when $V_{seek}$ is equal to or greater than $T_{seek}$, data for said data storage device is transferred to said auxiliary memory, and said transducer head undergoes another stop/start operation.

10. The method of claim 9, wherein after said another stop/start operation is completed, said data stored in said auxiliary memory is transferred to said data storage device.

11. A method of increasing the reliability of a data storage device comprising a memory element disk containing data rotatably mounted about an axis, a transducer head, and actuator for moving said transducer head relative to said disk, and a counter for counting the number of seek operations performed by said transducer head, said method comprising the steps of:

(a) defining a threshold seek operation count $T_{seek}$;

(b) counting the number of seek operations since the last stop/start operation to determine $M_{seek}$;

(c) recalling the total number of seek operations completed by the data storage device to define $N_{seek}$;

(d) defining $D_{seek}$ by determining the difference between $N_{seek}$ and $M_{seek}$;

(e) determining whether $D_{seek}$ is greater than $T_{seek}$; and (f) performing another stop/start operation when $D_{seek}$ is greater than $T_{seek}$.

12. The method of claim 11, wherein when $D_{seek}$ is equal to or greater than $T_{seek}$, said transducer head undergoes another stop/start operation.

13. The method of claim 12, wherein $M_{seek}$ is reset to equal $N_{seek}$ when said another stop/start operation is completed.

14. The method of claim 13, wherein $M_{seek}$ is reset to equal $N_{seek}$ before said another stop/start operation is completed.

15. The method of claim 11, wherein said device additionally comprises auxiliary memory.

16. The method of claim 15, wherein when $D_{seek}$ is equal to or greater than $T_{seek}$, data for said data storage device is transferred to said auxiliary memory, and said transducer head undergoes another stop/start operation.

17. The method of claim 16, wherein after said another stop/start operation is completed, said data stored in said auxiliary memory is transferred to said data storage device.

* * * * *